United States Patent [19]

Ceshkovsky

[11] Patent Number: 5,583,841
[45] Date of Patent: Dec. 10, 1996

[54] APPARATUS FOR IMPROVED SEARCH ON INFORMATION STORAGE MEMBER ROTATING AT CONSTANT LINEAR VELOCITY

[75] Inventor: Ludwig Ceshkovsky, Fountain Valley, Calif.

[73] Assignee: Discovision Associates, Irvine, Calif.

[21] Appl. No.: 375,461

[22] Filed: Jan. 17, 1995

[51] Int. Cl.$^6$ .................................................. G11B 7/00
[52] U.S. Cl. ..................... 369/124; 369/106; 369/44.25; 369/44.29; 369/44.35; 369/32; 369/50; 369/54; 360/73.03
[58] Field of Search ............................. 369/32, 124, 106, 369/99, 50, 54, 44.25, 44.26, 44.27, 44.28, 44.29, 44.31, 44.35; 360/72.1, 72.2, 73.03

[56] References Cited

U.S. PATENT DOCUMENTS

| | | |
|---|---|---|
| 4,492,992 | 1/1985 | Rooney et al. |
| 4,514,771 | 4/1985 | Stark et al. ........................ 360/73.03 |
| 4,530,018 | 7/1985 | Hoshino et al. ..................... 360/72.1 |
| 4,530,083 | 7/1985 | Ishihara . |
| 4,571,712 | 2/1986 | Romano et al. ...................... 369/44 |
| 4,855,978 | 8/1989 | Kanamaru . |
| 4,866,695 | 9/1989 | Suzuki et al. ...................... 369/266 |
| 5,170,386 | 12/1992 | Tateishi ............................. 369/50 |
| 5,216,647 | 6/1993 | Kitani ............................ 369/44.28 |
| 5,315,571 | 5/1994 | Maeda et al. ........................ 369/50 |
| 5,319,622 | 6/1994 | Martin ........................... 369/44.14 |
| 5,412,629 | 5/1995 | Shirane ............................. 369/32 |
| 5,434,829 | 7/1995 | Maeda et al. ........................ 369/54 |

FOREIGN PATENT DOCUMENTS

| | | |
|---|---|---|
| 056256 | 4/1983 | Japan . |
| 185071 | 10/1984 | Japan . |

*Primary Examiner*—Loha Ben
*Attorney, Agent, or Firm*—Ronald J. Clark; Robert T. Braun; Arthur S. Bickel

[57] ABSTRACT

In a data reproducing apparatus, an optical pick-up is radially movable with respect to, and recovers information from, an information storage member. A motor rotates an information storage member. A spindle servo controls the speed of rotation of the motor in response to a timing signal, to provide constant linear velocity between the information storage member and the optical pick-up. A signal processor creates a recovered timing signal from the information recovered by the optical pick-up, and passes the recovered timing signal to a switching circuit. During normal playback, the switching circuit passes the recovered timing signal to the spindle servo as the timing signal. During search, a controller directs an oscillator to output a reference timing signal to the switching circuit. A controller directs the switching circuit to pass the reference timing signal to the spindle servo as the timing signal while the optical pick-up is moving radially with respect to the information storage member. When the optical pick-up reaches or nears the target track on the information storage member, the controller directs the switching circuit to again pass the recovered timing signal to the spindle servo.

3 Claims, 1 Drawing Sheet

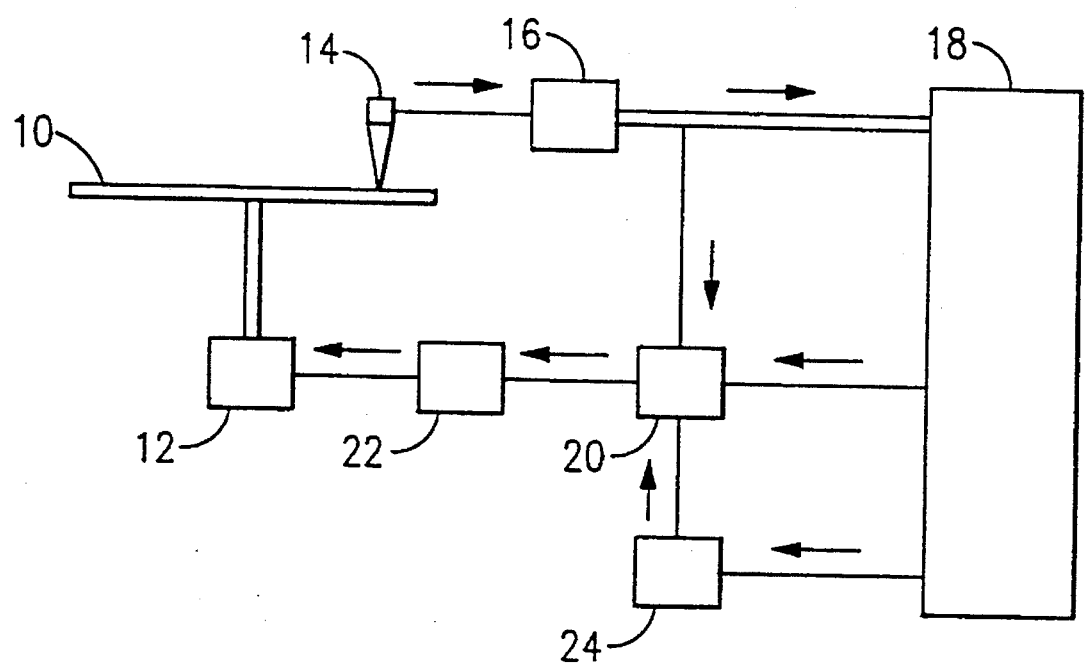

APPARATUS FOR IMPROVED SEARCH ON INFORMATION STORAGE MEMBER ROTATING AT CONSTANT LINEAR VELOCITY

FIELD OF THE INVENTION

The present invention relates to an information reproducing device and method which reproduces various types of information on and from an information storage member rotating at a constant linear velocity.

DESCRIPTION OF THE BACKGROUND ART

U.S. Pat. No. 4,514,771 discloses a rotating memory disk with a surface divided into a number of concentric track zones each containing a predetermined number of tracks. An apparatus varies the rotational speed of the disk in accordance with the radial position of a transducer relative to the disk. The rotational speed of the disk is maintained constant while the transducer is within a given zone. The apparatus includes a controller which monitors the actual motor speed by way of a tachometer feedback signal, and which effects a change in the actual motor speed if it varies from the desired motor speed.

U.S. Pat. No. 4,530,018 discloses a data recording/reproducing head and an optical disk having a plurality of data-storing tracks organized as track groups. The optical disk is rotated by a motor. As the head is tracing tracks included in the same track group, the disk is made to rotate at a constant angular speed. When the head tracing is changed among the track groups, a motor control section changes the angular velocity of the disk to a desired velocity. To accomplish this, the motor control section phase-compares a rotation signal from the motor with a reference oscillation signal and produces a rotation control signal which controls the motor.

U.S. Pat. No. 5,315,571 discloses an information recording and reproducing device for use with compact disks (CDs) and CD-ROMs (Compact Disc-Read Only Memory). The device writes the reproduced data into a memory means by using a writing clock in synchronization with the reproduced data from the recording medium. The reproduced data is then read out from the memory means by using a first reading clock in synchronization with the reproduced data. In another embodiment for use with information, such as music, which must be reproduced at a predetermined rate, a switching means selects a second reading clock having the determined reference frequency as a reading clock.

SUMMARY OF THE INVENTION

The apparatus and method of the present invention allow faster access time for searching for a target track on an information storage member rotating at a constant linear velocity.

According the invention, a motor means rotates an information storage member at a constant linear velocity with respect to an optical pick-up. The optical pick-up, which is radially movable with respect to the information storage member, recovers information from the information storage member and passes it to a signal processor. The signal processor creates a recovered timing signal from the information and passes the recovered timing signal to a switching circuit. During normal playback, the switching circuit passes the recovered timing signal to a spindle servo, which controls the rate of rotation of the motor means.

When a search function is initiated, a controller directs an oscillator to produce a reference timing signal and to pass it to the switching circuit. As the optical pick-up is moving radially with respect to the information storage member toward the target track, the switching circuit passes the reference timing signal, instead of the recovered timing signal, to the spindle servo.

This process allows the motor means and the information storage member to begin accelerated or decelerated rotation, as required for constant linear velocity at the target track, during the radial movement of the optical pick-up. Therefore, access time is shortened because the spindle servo does not need to wait for a recovered timing signal from the optical pick-up and signal processor to begin adjusting the speed of rotation of the motor means.

Other aspects of the invention will become apparent from the following description with reference to the drawings.

BRIEF DESCRIPTION OF THE DRAWINGS

The illustrated FIGURE is a block diagram of one embodiment of the invention.

DETAILED DESCRIPTION OF THE PREFERRED EMBODIMENT

In one embodiment of the invention, the invention comprises a motor, an optical pick-up, a servo, a switching circuit, a signal processor, a controller, and an oscillator. The motor rotates an information storage member, and the optical pick-up, which is radially movable with respect to the information storage member, recovers information from the information storage member. The signal processor responds to the information recovered from the information storage member by the optical pick-up and provides a recovered timing signal to the switching circuit. The oscillator responds to the controller and provides a reference timing signal to the switching circuit. The switching circuit provides either the recovered timing signal or the reference timing signal to the servo as a timing signal, and the servo controls the speed of rotation of the motor in response to the timing signal.

In another embodiment of the invention, the invention is a method for controlling the rotational velocity of a spindle servo. This method comprises the steps of recovering a timing signal from information recovered from an information storage member rotating in response to the spindle servo, creating a reference timing signal in an oscillator, and providing either the recovered timing signal to the spindle servo to maintain the rotational velocity or the reference timing signal to the spindle servo to change the rate of the rotational velocity.

Referring to the exemplary FIGURE, there is shown a block diagram of an embodiment of the invention during normal playback. An information storage member 10 with information organized in circumferential or spiral tracks (not shown) is rotated by a motor means 12. Information is recovered from the information storage member 10 by an optical pick-up 14. The optical pick-up 14 is radially movable with respect to the information storage member 10. The information recovered by the optical pickup up 14 is passed to a signal processor 16.

The signal processor 16 processes the information recovered by the optical pickup 14, and creates a recovered timing signal. The signal processor 16 then passes the information recovered by the optical pick-up 14 and the recovered timing signal to a controller 18, which may then output the information recovered by the optical pick-up 14 as needed. Additionally, the signal processor 16 passes the recovered timing signal to a switching circuit 20.

During normal playback the switching circuit 20 passes the recovered timing signal to a spindle servo 22. As is well-known in the art, the spindle servo 22 adjusts the speed of rotation of the motor means 12 in response to the feedback received in the form of the recovered timing signal. In this manner, the spindle servo 22 controls the speed of rotation of the motor means 12 to maintain a constant linear velocity (CLV) in the circumferential direction between the information storage member 10 and the optical pick-up 14.

When a search function is invoked, the controller 18 determines the desired speed of rotation of the motor means 12 at the target track. The controller 18 then sends a signal to an oscillator 24, directing the oscillator 24 to output a reference timing signal to the switching circuit 20. This reference timing signal is identical to the timing signal which the signal processor 16 would output to the switching circuit 20 during normal playback of the target track with the information storage member 10 rotating at the proper speed. The controller 18 also directs the switching circuit 20 to pass the reference timing signal from the oscillator 24, not the recovered timing signal from the signal processor 16, to the spindle servo 22. When the target track or an area near the target track is reached, the controller 18 directs the switching circuit 20 to disconnect the reference timing signal from the oscillator 24 and reconnect the recovered timing signal from the signal processor 16 to the spindle servo 22.

This process allows the spindle servo 22 to change the rate of rotation of the motor means 12, and consequently the information storage member 10, while the optical pick-up 14 is moving radially relative to the information storage member 10 toward the target track. The spindle servo 22 does not need to wait for the recovered timing signal from the signal processor 16 at the target track to begin changing the rate of rotation of the motor means 12 and information storage member 10.

The information storage member 10 may be in the form of a disc. It may be a compact disc, a compact disc-read only memory (CD-ROM), a video disc, a laser disc, a mini-disc, or any other information storage device in a suitable form. The information recovered from the information storage member 10 by the optical pick-up 14 may be stored either optically, magneto-optically, or in any form readable by an optical pick-up 14. It would be obvious to one skilled in the art to apply this invention to such areas.

Additionally, the controller 18 may be either a processor or a computer. The controller 18 may either be general-purpose, or dedicated to the control functions described herein. Furthermore, it would be obvious to one skilled in the art to have multiple controllers, each responsible for one or more of the control functions described herein.

The oscillator 24 may be a voltage-controlled oscillator or any other oscillator capable of producing different frequency signals responsive to signals from the controller 18. Also, when a search begins, the controller 18 may direct the oscillator 24 to output a reference timing signal which increases the rate of change of the rotational velocity of the motor means 12 and the information storage member 10, or to output a reference timing signal which keeps constant the rate of change of the rotational velocity of the motor means 12 and the information storage member 10.

While the invention has been particularly shown and described with reference to a preferred embodiment and alterations thereto, it would be understood by those skilled in the art that various changes in form and detail may be made therein without departing from the spirit and scope of the invention.

I claim:

1. An apparatus for reproducing information comprising:

motor means for rotating an information storage member;

an optical pick-up for recovering information from the information storage member, said optical pick-up being radially movable with respect to the information storage member;

a servo for controlling the speed of rotation of said motor means in response to a timing signal;

a switching circuit for providing either a recovered timing signal or a reference timing signal to said servo as the timing signal;

a signal processor responsive to the information recovered from the information storage member by said optical pick-up for providing the recovered timing signal to said switching circuit;

a controller; and an oscillator responsive to said controller for providing the reference timing signal to said switching circuit.

2. An apparatus as defined in claim 1, wherein said controller comprises a microprocessor.

3. An apparatus as defined in claim 1, wherein said controller comprises a computer.

\* \* \* \* \*